United States Patent
Soliman et al.

(10) Patent No.: US 9,955,494 B2
(45) Date of Patent: *Apr. 24, 2018

(54) WWAN AND WLAN COOPERATIVE SUPPORT OF MULTI-SIM DEVICES

(71) Applicant: QUALCOMM Incorporated, San Diego, CA (US)

(72) Inventors: Samir Salib Soliman, Poway, CA (US); Bongyong Song, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/142,125

(22) Filed: Apr. 29, 2016

(65) Prior Publication Data

US 2016/0249374 A1 Aug. 25, 2016

Related U.S. Application Data

(63) Continuation of application No. 14/525,983, filed on Oct. 28, 2014, now Pat. No. 9,362,988.

(51) Int. Cl.
| | |
|---|---|
| *H04M 1/00* | (2006.01) |
| *H04W 72/12* | (2009.01) |
| *H04B 7/0404* | (2017.01) |
| *H04W 88/06* | (2009.01) |
| *H04W 40/06* | (2009.01) |
| *H04W 72/02* | (2009.01) |
| *H04W 72/04* | (2009.01) |
| *H04W 60/00* | (2009.01) |

(52) U.S. Cl.
CPC ...... *H04W 72/1215* (2013.01); *H04B 7/0404* (2013.01); *H04W 40/06* (2013.01); *H04W 72/02* (2013.01); *H04W 72/048* (2013.01); *H04W 88/06* (2013.01); *H04W 60/005* (2013.01)

(58) Field of Classification Search
CPC ..... H04B 7/0404; H04W 88/06; H04W 84/12
USPC .................................... 455/553.1
See application file for complete search history.

(56) References Cited

U.S. PATENT DOCUMENTS

| | | |
|---|---|---|
| 7,636,560 B2 | 12/2009 | Ku |
| 8,014,779 B2 | 9/2011 | Kanada |
| 9,131,429 B1 | 9/2015 | Bharadwaj et al. |
| 9,362,988 B2 * | 6/2016 | Soliman ............ H04W 72/1215 |
| 2007/0242784 A1 | 10/2007 | Sampson et al. |
| 2011/0047583 A1 | 2/2011 | Howard et al. |
| 2012/0093075 A1 | 4/2012 | Derkach et al. |

(Continued)

OTHER PUBLICATIONS

ISA/EPO, International Search Report and Written Opinion of the International Searching Authority, Int'l Appl. No. PCT/US2015/053076, Jan. 5, 2016, European Patent Office, Rijswijk, NL, 13 pgs.

*Primary Examiner* — Juan A Torres
(74) *Attorney, Agent, or Firm* — Holland & Hart LLP

(57) ABSTRACT

A user equipment (UE) may communicate over a first wireless wide area network (WWAN). The first WWAN may be supported by a first subscriber identity module (SIM) of the UE. The UE may also communicate simultaneously over a second WWAN supported by a second SIM. The UE may process the second WWAN communication with a portion of a WWAN module and a portion of a wireless local area network (WLAN) module.

91 Claims, 13 Drawing Sheets

(56) References Cited

U.S. PATENT DOCUMENTS

| | | |
|---|---|---|
| 2012/0178402 A1 | 7/2012 | Krishnamoorthy et al. |
| 2012/0309341 A1* | 12/2012 | Ward .................. H04W 4/22 |
| | | 455/404.2 |
| 2012/0322410 A1 | 12/2012 | Lodeweyckx |
| 2013/0225107 A1 | 8/2013 | Lane et al. |
| 2013/0235814 A1 | 9/2013 | Wietfeldt et al. |
| 2013/0315141 A1 | 11/2013 | Homchaudhuri et al. |
| 2014/0146732 A1 | 5/2014 | Olufunmilola et al. |
| 2014/0269857 A1 | 9/2014 | Rimini et al. |
| 2015/0155891 A1 | 6/2015 | Soliman |

* cited by examiner

WWAN AND WLAN COOPERATIVE SUPPORT OF MULTI-SIM DEVICES

CROSS REFERENCES

The present Application for Patent is a continuation of U.S. patent application Ser. No. 14/525,983 by Soliman et al., entitled "WWAN and WLAN Cooperative Support of Multi-SIM Devices," filed Oct. 28, 2014, assigned to the assignee hereof, and expressly incorporated by reference herein.

BACKGROUND

Field of the Disclosure

The present disclosure, for example, relates to wireless communications systems, and more particularly to cooperative use of wireless wide area network (WWAN) and wireless local area network (WLAN) components in a single device supporting multiple subscriber identity modules (SIMs).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations or access points, each simultaneously supporting communication for multiple communication devices, otherwise known as user equipment (UEs). A base station or access point may communicate with UEs on downlink channels (e.g., for transmissions from a base station to a UE) and uplink channels (e.g., for transmissions from a UE to a base station). Communication between a UE and a base station may use a wireless wide area network (WWAN), while communication between a UE and an access point may use a wireless local area network (WLAN). Wi-Fi is an example of a common WLAN technology supported by a UE. UEs typically include different WWAN and WLAN receive (Rx) and transmit (Tx) chains. For example, a UE may have one or more Rx and Tx chains used for WWAN transmissions, and may also have separate Rx and Tx chains used for WLAN transmissions.

Some UEs may include a subscriber identity module (SIM), which may be used to enable the UE to communicate on a particular network. Some UEs are dual- or multiple-SIM devices, meaning that the UE is configured to receive and use more than one SIM card. Thus, a multiple-SIM device may simultaneously operate in either an active or a standby mode on more than one network. For example, a dual-SIM, dual-active (DSDA) device is configured to actively transmit and receive on two different networks at the same time. A dual-SIM, dual standby (DSDS) device is configured to allow active transmission on one network while being in standby mode on a second network. Multiple-SIM, multiple active (MSMA) and/or multiple-SIM, multiple standby (MSMS) devices may also be used. For each additional SIM, additional Tx and/or Rx chains may be used, adding to the cost and complexity of the UE.

SUMMARY

A UE may include multiple antennas and multiple modules that may generally be used for different radio access technologies (RATs). For example, communication between a UE and a base station may use a wireless wide area network (WWAN), while communication between a UE and an access point may use a wireless local area network (WLAN). UEs typically include different WWAN and WLAN receive (Rx) and transmit (Tx) chains in different modules. Instead of adding additional Rx and Tx chains to support additional SIMs, components within the UE's WLAN module may be used for WWAN processing in support of one or more SIMs. For example, in a DSDS or MSMS situation, components of the UE's WLAN module may be used as part of an Rx chain for a second or additional WWAN signal being received by the UE. In a DSDA or MSMA situation, components of the UE's WLAN module may also be used as part of a Tx chain for a second or additional WWAN signal being transmitted by the UE.

In a first set of illustrative examples, a method for wireless communication is described. In one example, the method may include communicating over a first wireless wide area network (WWAN), the first WWAN supporting a first subscriber identity module (SIM) of a user equipment (UE); communicating over a second WWAN, the second WWAN supporting a second SIM of the UE; processing the first WWAN communication with a WWAN transceiver of the UE; and processing the second WWAN communication with a portion of the WWAN transceiver and a portion of a wireless local area network (WLAN) transceiver of the UE.

In some examples of the method, communicating over the first WWAN comprises receiving a WWAN signal on a first WWAN antenna of the WWAN module; and communicating over the second WWAN comprises receiving a WWAN signal on a second WWAN antenna of the WWAN module. In some examples of the method, processing the second WWAN communication comprises: processing the received WWAN signal using radio frequency (RF) frontend components of the WWAN module; and processing the received WWAN signal using a low noise amplifier, down-converter and filter of the WLAN module. In some examples of the method, processing the second WWAN communication comprises: processing the received WWAN signal using radio frequency (RF) frontend components of the WWAN module; and processing the received WWAN signal using an analog-to-digital converter of the WLAN module. In some examples of the method, processing the second WWAN communication comprises: processing the received WWAN signal using radio frequency (RF) frontend components and a low noise amplifier of the WWAN module; and processing the received WWAN signal using a down-converter and filter of the WLAN module.

In some examples of the method, communicating over the first WWAN comprises transmitting a WWAN signal on a first WWAN antenna of the WWAN module; and communicating over the second WWAN comprises transmitting a WWAN signal on a second WWAN antenna of the WWAN module. In some examples of the method, processing the second WWAN communication comprises: processing the WWAN signal prior to transmission using a driver amplifier, up-converter and filter of the WLAN module; and processing the WWAN signal prior to transmission using radio frequency (RF) frontend components of the WWAN module. In some examples of the method, processing the second WWAN communication comprises: processing the WWAN signal prior to transmission using a digital-to-analog converter of the WLAN module; and processing the WWAN signal prior to transmission using radio frequency (RF) frontend components of the WWAN module.

In some examples, the method further includes communicating over the WLAN; and processing the WLAN communication with the WLAN module of the UE. In some examples of the method, communicating over the first WWAN comprises communicating over a first WWAN antenna; communicating over the second WWAN comprises communicating over a second WWAN antenna; and communicating over the WLAN comprises communicating over a WLAN antenna. In some examples of the method, processing the second WWAN communication comprises: identifying a first time for processing the second WWAN communication with the portion of the WLAN module; and identifying a second time for processing the WLAN communication with the portion of the WLAN module. In some examples of the method, communicating over the second WWAN comprises: communicating over a global system for mobile communications (GSM) network.

In a second set of illustrative examples, an apparatus for wireless communication is described. In one example, the apparatus may include means for communicating over a first wireless wide area network (WWAN), the first WWAN supporting a first subscriber identity module (SIM) of a user equipment (UE); means for communicating over a second WWAN, the second WWAN supporting a second SIM of the UE; means for processing the first WWAN communication with a WWAN module of the UE; and means for processing the second WWAN communication with a portion of the WWAN module and a portion of a wireless local area network (WLAN) module of the UE. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to communicate over a first wireless wide area network (WWAN), the first WWAN supporting a first subscriber identity module (SIM) of a user equipment (UE); communicate over a second WWAN, the second WWAN supporting a second SIM of the UE; process the first WWAN communication with a WWAN module of the UE; and process the second WWAN communication with a portion of the WWAN module and a portion of a wireless local area network (WLAN) module of the UE. In some examples of the apparatus, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication is described. In one example, the code may be executable by a processor to communicate over a first wireless wide area network (WWAN), the first WWAN supporting a first subscriber identity module (SIM) of a user equipment (UE); communicate over a second WWAN, the second WWAN supporting a second SIM of the UE; process the first WWAN communication with a WWAN module of the UE; and process the second WWAN communication with a portion of the WWAN module and a portion of a wireless local area network (WLAN) module of the UE. In some examples of the non-transitory computer-readable medium, the code may also be executable by the processor to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Many UEs include multiple antennas and modules so as to facilitate communications on different RATs. In one example, a UE may include one or more WWAN antennas and may also include at least one WLAN antenna. The antennas may each have corresponding modules that include receive (Rx) and transmit (Tx) chains. A UE having multiple SIMs could also have multiple antennas to support communications based on each SIMs. However, the expense of additional antennas and modules in a UE may be prohibitive. Instead, in a DSDS or MSMS situation, an additional WWAN signal (as facilitated by an additional SIM) may be received using a diversity WWAN antenna. The additional WWAN signal may then be processed using the radio frequency (RF) frontend components of a WWAN Rx chain. Then, however, the additional signal may be routed to the WLAN module for further processing. In this way, the UE is able to reuse its existing WWAN and WLAN antennas and modules to support communications facilitated by additional SIMs.

In one example, the additional SIM-supported signal may be processed using an updated low noise amplifier (LNA) and down-converter/filters in the WLAN module, and then may be sent in analog form to the UE's WWAN baseband chip for processing. In another example, the additional signal may be processed using an updated LNA, synthesizer/filter and an analog-to-digital converter in the WLAN module, and then sent in digital form to the WWAN baseband chip for processing.

In the DSDA or MSMA situation, an additional WWAN transmission may also be transmitted using the diversity WWAN antenna. Prior to being transmitted, the additional WWAN transmission may be output from the UE's WWAN baseband chip in either analog or digital form. If in digital form, the additional WWAN transmission may be processed by a digital-to-analog converter located in the UE's WLAN module. Once the additional transmission is in analog form, it may be processed using the up-converter/filter and a driver amplifier (DA), both located within the WLAN module. Then, the additional transmission may be routed to the WWAN Tx chain. The additional transmission may be further processed using the RF frontend components of the WWAN Tx chain and then transmitted via the diversity WWAN antenna.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
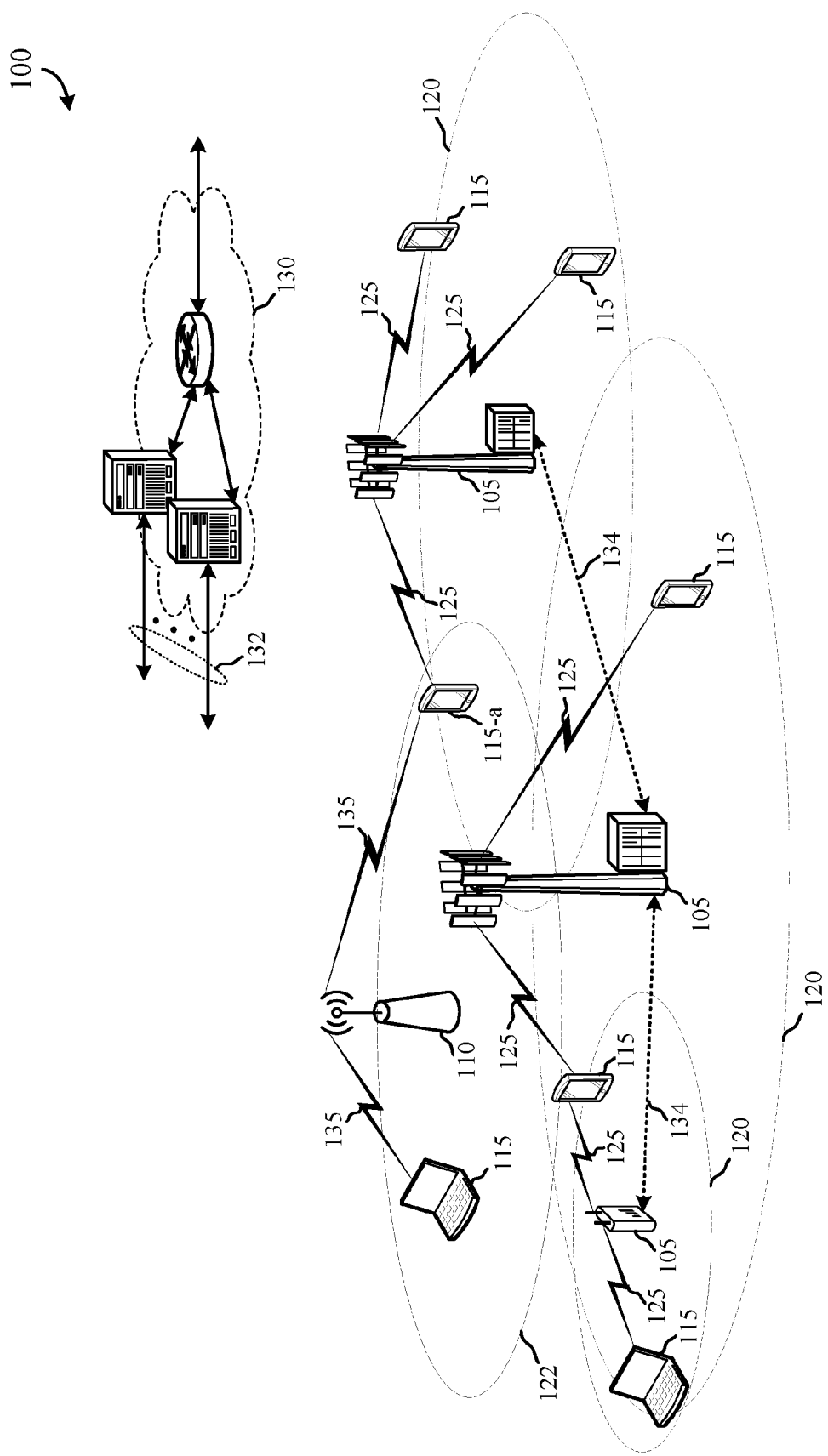
FIG. 1 shows a system diagram of a wireless communications system, in accordance with various aspects of the present disclosure.

Referring first to FIG. 1, a system diagram illustrates an example of a wireless communications system 100. The wireless communications system 100 may include base station(s) 105, access point(s) (AP) 110, and mobile devices such as UEs 115. The AP 110 may provide wireless communications via a WLAN radio access network (RAN) such as, e.g., a network implementing at least one of the IEEE 802.11 family of standards. The AP 110 may provide, for example, WLAN or other short range (e.g., Bluetooth and Zigbee) communications access to a UE 115. Each AP 110 has a geographic coverage area 122 such that UEs 115 within that area can typically communicate with the AP 110. UEs 115 may be multi-access mobile devices that communicate with the AP 110 and a base station 105 via different radio access networks. The UEs 115, such as mobile stations, personal digital assistants (PDAs), other handheld devices, netbooks, notebook computers, tablet computers, laptops, display devices (e.g., TVs, computer monitors, etc.), printers, etc., may be stationary or mobile and traverse the geographic coverage areas 122 and/or 120, the geographic coverage area of a base station 105. While only one AP 110 is illustrated, the wireless communications system 100 may include multiple APs 110. Some or all of the UEs 115 may associate and communicate with an AP 110 via a communication link 135 and/or with a base station 105 via a communication link 125.

The wireless communications system 100 may also include a core network 130. The core network 130 may provide user authentication, access authorization, tracking, Internet Protocol (IP) connectivity, and other access, routing, or mobility functions. The base stations 105 interface with the core network 130 through backhaul links 132 (e.g., 51, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

A UE 115 can be covered by more than one AP 110 and/or base station 105 and can therefore associate with multiple APs 110 or base stations 105 at different times. For example, a single AP 110 and an associated set of UEs 115 may be referred to as a basic service set (BSS). An extended service set (ESS) is a set of connected BSSs. A distribution system (DS) (not shown) is used to connect APs 110 in an extended service set. A geographic coverage area 122 for an access point 110 may be divided into sectors making up only a portion of the geographic coverage area (not shown). The wireless communications system 100 may include APs 110 of different types (e.g., metropolitan area, home network, etc.), with varying sizes of coverage areas and overlapping coverage areas for different technologies. Although not shown, other wireless devices can communicate with the AP 110.

The base stations 105 may wirelessly communicate with the UEs 115 via base station antennas. Each of the base station 105 sites may provide communication coverage for a respective geographic coverage area 120. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 120 for a base station 105 may be divided into sectors making up only a portion of the coverage area (not shown). The wireless communications system 100 may include base stations 105 of different types (e.g., macro and/or small cell base stations). There may be overlapping geographic coverage areas 120/122 for different technologies.

In some examples, the wireless communications system 100 includes portions of an LTE/LTE-A network. In LTE/LTE-A networks, the term evolved Node B (eNB) may be generally used to describe the base stations 105, while the term UE may be generally used to describe the mobile devices 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, APs, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Similarly, communication links 135, also shown in wireless communications system 100, may include UL transmissions from a UE 115 to an access point 110, and/or DL transmissions from an access point 110 to a UE 115.

In some embodiments of the system 100, base stations 105, APs 110, and/or UEs 115 may include multiple antennas for employing antenna diversity schemes to improve communication quality and reliability between base stations 105, APs 110, and UEs 115. Additionally or alternatively, base stations 105, APs 110, and/or UEs 115 may employ multiple-input, multiple-output (MIMO) techniques that may take advantage of multi-path environments to transmit multiple spatial layers carrying the same or different coded data.

System 100 includes a UE 115-a which is in communication with both a base station 105 and an access point 110. As an example, UE 115-a may communicate with the access point 110 using Wi-Fi or other WLAN communications, while the UE 115-a may communicate with the base stations 105 using LTE, GSM, or other WWAN communications. The communications may be at the same time. As an example, the UE 115-a may be a DSDA or MSMA device and may communicate with one base station 105 using LTE communications, another base station 105 using GSM communications, and an access point 110 using Wi-Fi communications. As another example, the UE 115-a may communicate with one base station 105 using LTE communications, the same base station 105 using GSM communications, and an access point 110 using Wi-Fi communications.

The UE 115-a may include a single WWAN Rx and Tx chain that may be shared between multiple WWAN communications. For example, a first WWAN communication (such as an LTE communication) may utilize the WWAN Rx chain during a first time period, and a second WWAN communication (such as a GSM communication) may utilize the WWAN Rx chain during a second time period. When a WWAN communication facilitated by one SIM is utilizing the WWAN Rx or Tx chains, the WWAN Rx or Tx chains may be unavailable for use for different WWAN communications facilitated by different SIMs. Therefore, while the multiple WWAN communications are occurring, the UE 115-a may utilize a portion of a WLAN module in the UE to offload a portion of the processing for one of the WWAN communications from the WWAN module to the WLAN module. In this way, the availability of the single WWAN Rx and Tx chains may be increased.

Figure 2A:
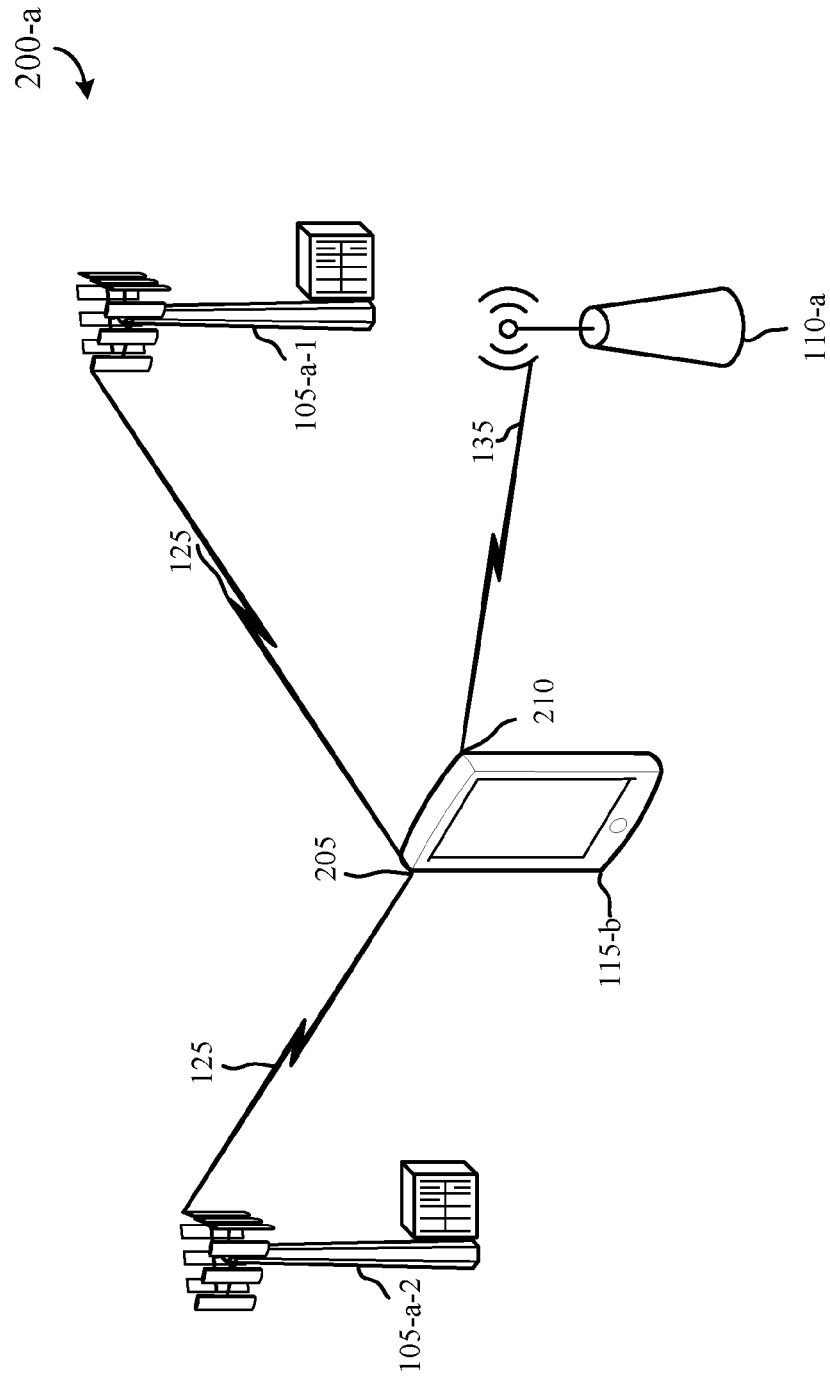
FIG. 2A illustrates a system diagram that shows an example of a wireless communications system, in accordance with various aspects of the present disclosure.

FIG. 2A illustrates a system diagram that shows an example of a wireless communications system 200-a. The wireless communications system 200-a may include base stations 105-a-1, 105-a-2, access point 110-a and UE 115-b. The UE 115-b may be an example of UE 115-a in system 100 of FIG. 1 and may be engaged in both WWAN and WLAN communications. The base stations 105-a-1, 105-a-2 may be examples of base stations 105 included in system 100 of FIG. 1, and the access point 110-a may be an example of the access point 110 in system 100 of FIG. 1.

In system 200-a, the UE 115-b may include at least two different sets of antennas, WWAN antennas 205 and WLAN antennas 210. For example, WWAN antennas 205 may be a WWAN antenna associated with a WWAN module. Using the WWAN antennas 205, the 30 UE 115-b may engage in WWAN communications with base station 105-a-1 and base station 105-a-2 via communication links 125. The WWAN antennas 205 and associated WWAN module may include both Rx and Tx chains used during WWAN communications. The WWAN antennas 205 may include one or more diversity WWAN antennas for WWAN communications with base station 105-a-1 and/or base station 105-a-2, where each WWAN communication supports a different SIM. The one or more diversity WWAN antennas 205 may also be used for WWAN communications with base station 105-a-1 and/or base station 105-a-2, where the WWAN communication supports one SIM in a carrier aggregation (CA) or multi-carrier mode.

In system 200-a, the UE 115-b may use the WLAN antennas 210 to communicate with the access point 110-a (via communication link 135). The communications with the access point 110-a may be Wi-Fi or other WLAN communications. As described in greater detail below, both the WWAN communications and the WLAN communications may share portions of the Tx and Rx chains of a WLAN module associated with the WLAN antennas 210. For example, while a WWAN communication from base station 105-a-1 may be received by the WWAN antennas 205, the WWAN communication may be processed by a portion of the WLAN Rx chain while the WWAN Rx chain is processing a different WWAN communication from base station 105-a-2. Each of the WWAN communication may support different SIMs included in the UE 115-b.

Figure 2B:
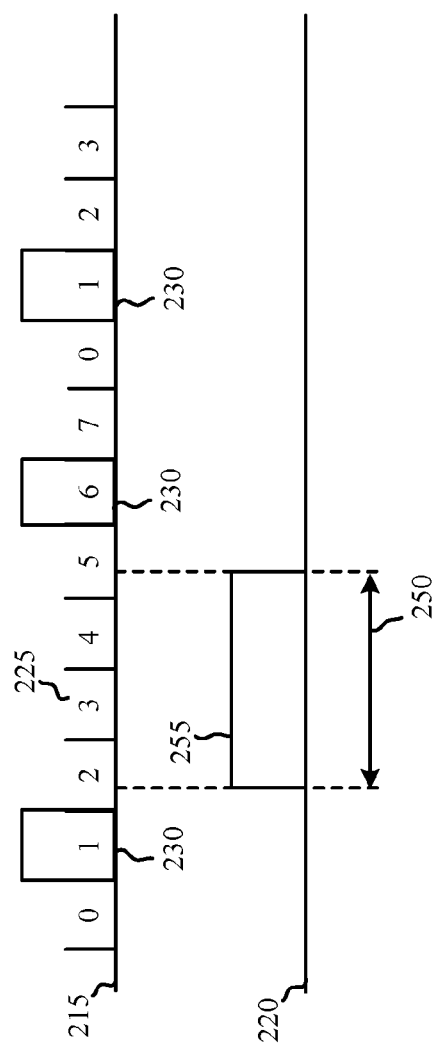
FIG. 2B illustrates an example timing diagram for WLAN and WWAN communications, in accordance with various aspects of the present disclosure.

FIG. 2B illustrates an example of a timing diagram 200-b for WLAN and WWAN communications, in accordance with various aspects of the present disclosure. The timing diagram 200-b includes a WWAN timeline 215 and a WLAN timeline 220. The WWAN timeline 215 may be divided into a plurality of equally spaced timeslots 225. A UE may be assigned certain timeslots 225 for communicating over the WWAN. For example, a WWAN communication 230 may occupy the first and sixth timeslots. The WWAN communication may be, for example, a GSM communication.

The UE may not be assigned specific timeslots for communicating over the WLAN. However, the UE may configure WLAN communications 255 to occur during a duration 250 when WWAN communications are not occurring. During the duration 250 when the WLAN communications are not occurring, the UE may use components of the WLAN module for processing other WWAN communications.

Figure 2C:
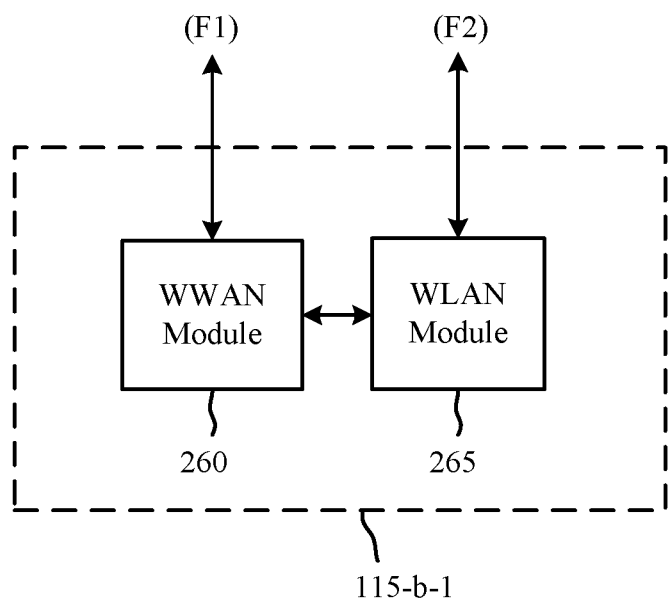
FIG. 2C shows a block diagram of a UE for use in wireless communications, in accordance with various aspects of the present disclosure.

FIG. 2C shows a block diagram 200-c of a UE 115-b-1 for use in wireless communications, in accordance with various aspects of the present disclosure. The UE 115-b-1 may include a WWAN module 260 and a WLAN 265. The WWAN module 260 may facilitate communications over a WWAN. The WWAN module 260 may support communications within a first frequency bandwidth F1 or first radio access technology (RAT). The WLAN module 265 may facilitate communications over a WLAN. The WLAN module 265 may support communications within a second frequency bandwidth F2 or second RAT. In some examples the first frequency bandwidth F1 and the second frequency bandwidth F2 may be adjacent bandwidths. In these examples, the UE 115-b-1 may send and/or receive WWAN communications using components of the WLAN module 265.

Figure 3:
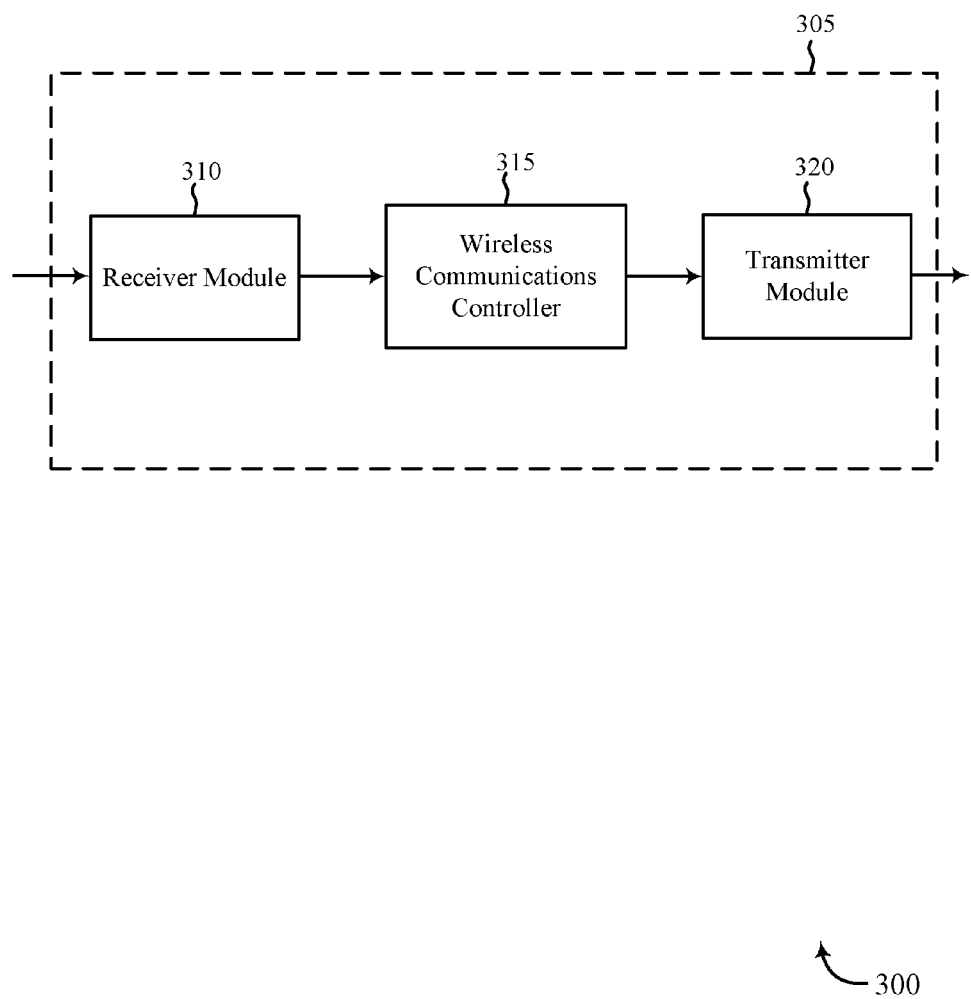
FIG. 3 shows a block diagram of a device for use in wireless communication, in accordance with various aspects of the present disclosure

FIG. 3 shows a block diagram 300 of a device 305 for use in wireless communication, in accordance with various aspects of the present disclosure. The device 305 may be an example of one or more aspects of a UE 115 described with reference to FIGS. 1 and/or 2. The device 305 may include a receiver module 310, a wireless communications controller 315, and/or a transmitter module 320. The device 305 may also be or include a processor (not shown). Each of these modules may be in communication with each other.

The components of the device 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 310 may receive information such as packets, user data, and/or control information associated with various information channels (e.g., control channels, data channels, etc.). The receiver module 310 may be configured to receive both WLAN communications (such as Wi-Fi communications) as well as WWAN communications (such as LTE or GSM communications). The receiver module 310 may use components for receiving WLAN communications to process WWAN communications. The receiver module 310 may then pass the WWAN communications processed by the WLAN components to the wireless communications controller 315.

The wireless communications controller 315 may include some or all of the components of a wireless modem, and/or control the wireless modem and other wireless communications. The wireless communications controller 315 may support the WWAN communications with multiple SIMs. Each SIM may be active and may allow for both receiving and transmitting of multiple WWAN communications. The wireless communications controller 315 may also perform additional baseband processing of the WWAN communications and the WLAN communications. The wireless communications controller 315 may pass baseband WWAN communications and baseband WLAN communications to the transmitter module 320 for transmission to a base station and/or access point.

The transmitter module 320 may transmit information such as packets, user data, and/or control information associated with various information channels (e.g., control channels, data channels, etc.). The transmitter module 320 may be configured to transmit both WLAN communications (such as Wi-Fi communications) as well as WWAN communications (such as LTE or GSM communications). The transmitter module 320 may use components for transmitting WLAN communications to instead process WWAN communications prior to transmission. In some examples, the transmitter module 320 may be collocated with the receiver module 310 in a transceiver module.

Figure 4:
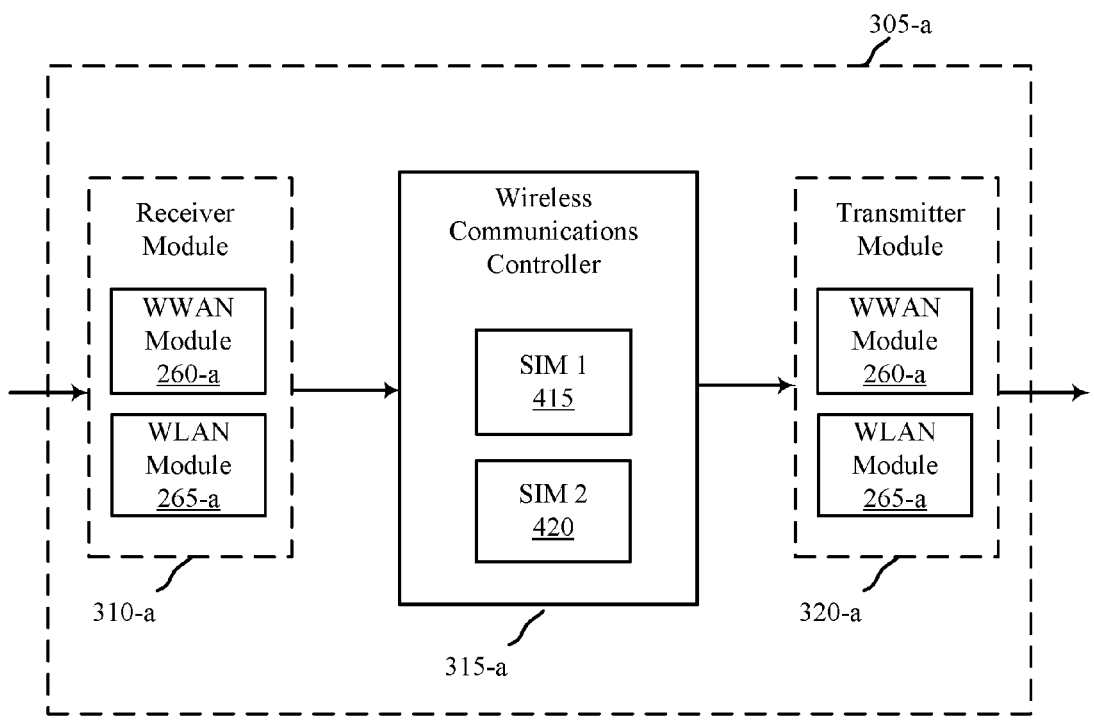
FIG. 4 shows a block diagram of a device for use in wireless communication, in accordance with various aspects of the present disclosure.

FIG. 4 shows a block diagram 400 of a device 305-a for use in wireless communication, in accordance with various examples. The device 305-a may be an example of one or more aspects of a UE 115 described with reference to FIGS. 1 and/or 2. It may also be an example of a device 305 described with reference to FIG. 3. The device 305-a may include a receiver module 310-a, a wireless communications controller 315-a, and/or a transmitter module 320-a, which may be examples of the corresponding modules of device 305. The device 305-a may also include a processor (not shown). Each of these components may be in communication with each other.

The receiver module 310-a may include a WWAN module 260-a and a WLAN module 265-a. The WWAN module 260-a may be used for processing a received WWAN communication. The WWAN module 260-a may include some or all of the components of Tx and Rx chains of a WWAN modem. The WWAN module 260-a may also route the received WWAN communication to the WLAN module 265-a for processing. The WLAN module 265-a may include some or all of the components of Tx and Rx chains of a WLAN modem. The WLAN module 265-a may process both WLAN and WWAN communications. The WWAN communications may be processed by a portion of the components in the WLAN module 265-a, and then passed to the wireless communications controller 315-a for baseband processing.

The wireless communications controller 315-a may include some or all of the components of the WWAN module 260-a and/or WLAN module 265-a, and/or control the operation of the WWAN module 260-a and WLAN module 265-a. The wireless communications controller 315-a may include a first SIM 415 and a second SIM 420. In some examples, the wireless communications controller 315-a may include additional SIMS (not shown). WWAN communications over a first communications network may support the first SIM 415. WWAN communications over a second communications network may support the second SIM 420. Each additional SIM (not shown) may support WWAN communications over additional communications networks. The first SIM 415 and the second SIM 420 may be active simultaneously, which may allow the device 305-a to support active communications over two communications networks. The wireless communications controller 315-a may also support WLAN communications at the same time as the WWAN communications.

The transmitter module 320-a may be collocated with the receiver module 310-a and may also include the WWAN module 260-a and the WLAN module 265-a. The WWAN module 260-a may be used for processing a WWAN communication prior to transmission. The WLAN module 265-a may process both WLAN and WWAN communications prior to transmission. The WWAN communication may be processed by a portion of the components in the WLAN module 265-a. The WLAN module 265-a may then route the WWAN communication to the WWAN module 260-a for further processing and transmission over a WWAN antenna.

Figure 5:
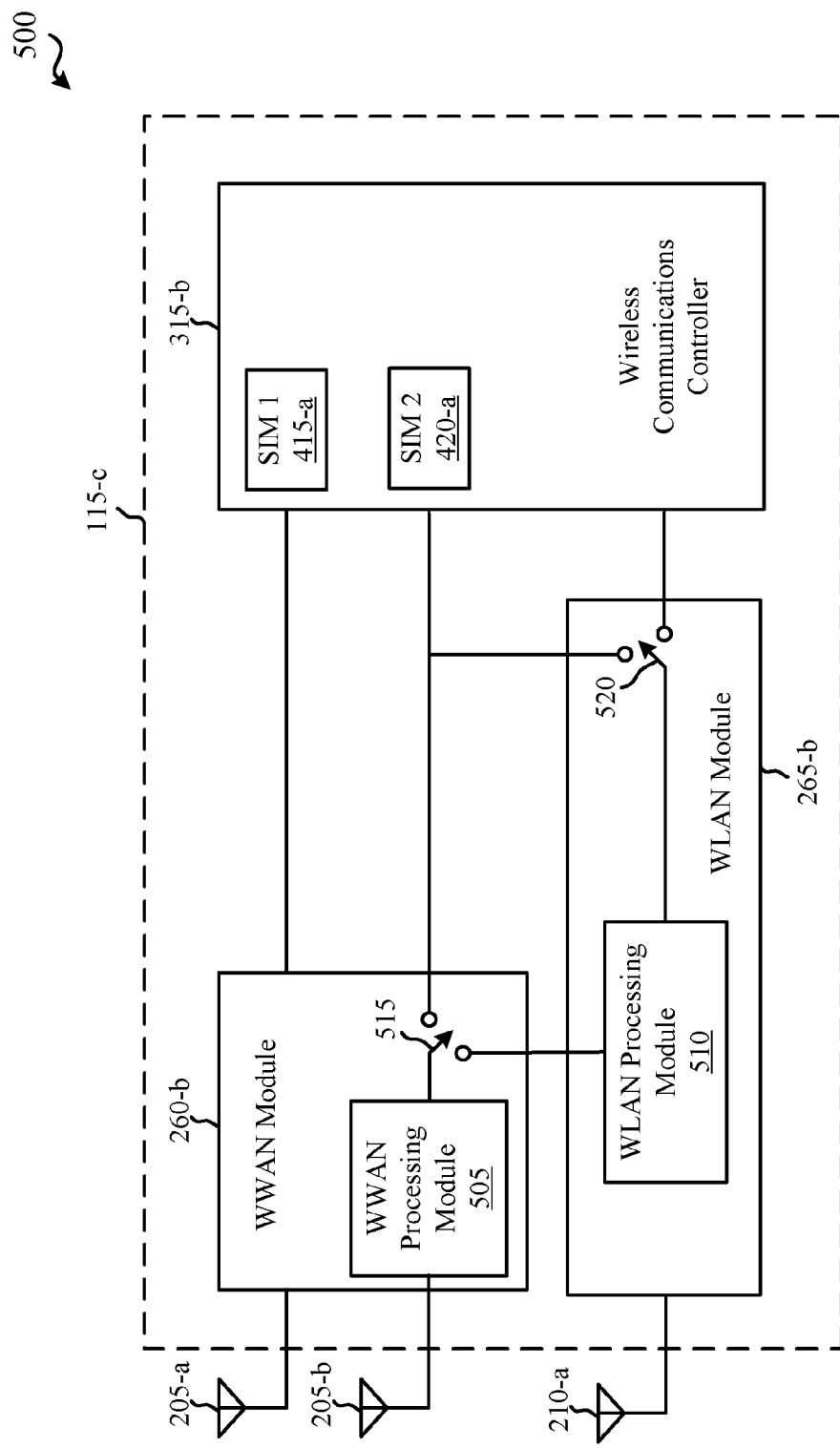
FIG. 5 shows a system for use in wireless communication, in accordance with various aspects of the present disclosure.

FIG. 5 shows a system 500 for use in wireless communication, in accordance with various examples. System 500 may include a UE 115-c, which may be an example of the UEs 115 of FIGS. 1 and/or 2. UE 115-c may also be an example of one or more aspects of devices 305 of FIGS. 3 and/or 4.

The UE 115-c may include a WWAN module 260-b, a WLAN module 265-b, and a wireless communications controller 315-b. The WWAN module 260-b may include some or all of the components of Tx and Rx chains of a WWAN modem. The WLAN module 265-b may include some or all of the components of Tx and Rx chains of a WWAN modem. The wireless communications controller 315-b may include some or all of the components of the WWAN module 260-b and/or WLAN module 265-b, and/or control the operation of the WWAN module 260-b and WLAN module 265-b. The wireless communications controller 315-b may support WWAN communications over multiple communications networks and/or multiple RATs through the use of multiple SIMs, such as first SIM 415-a and second SIM 420-a. In some examples, the wireless communications controller 315-b may include additional SIMs (not shown). In some examples, the first SIM 415-a may support a first WWAN communication. For example, the first WWAN communication may be an LTE communication.

The first WWAN communication may be a WWAN transmission, and may be processed by the WWAN module 260-b and transmitted over a primary WWAN antennas 205-a. Alternatively or in addition, the first WWAN communication may be a received WWAN communication. The received WWAN communication may be received by the primary WWAN antennas 205-a and processed by the WWAN module 260-b. The first WWAN communication may then be further processed by the wireless communications controller 315-a, as facilitated by the first SIM 415-a.

In some examples, the second SIM 420-a may support a second WWAN communication. The second WWAN communication may occur at or near the same time as the first WWAN communication supported by the first SIM 415-a. The second WWAN communication may be a WWAN communication over a different RAT and/or a different communication network. For example, the second WWAN communication may be a GSM communication. The second WWAN communication may be a received WWAN communication or a transmitted WWAN communication. The second WWAN communication may be received over a diversity WWAN antennas 205-b and/or transmitted over the diversity WWAN antennas 205-b.

For a received WWAN communication, the wireless communications controller 315-b may configure a WWAN processing module 505 of the WWAN module 260-b to process the received WWAN communication. The WWAN processing module 505 may include a portion of a Rx chain of the WWAN module 260-b. After processing with the portion of the Rx chain in the WWAN processing module 505, the received WWAN communication may be routed to a WLAN module 265-*b* for further processing. The WWAN communication may be routed to the WLAN module 265-*b* using a first switch 515. The first switch 515 may be configured by the wireless communications controller 315-*b* and/or the WWAN module 260-*b*.

The WLAN module 265-*b* may include a WLAN processing module 510 for processing the received WWAN communication and may include WLAN antenna(s) 210-*a* capable of concurrently transmitting and/or receiving multiple wireless communications. The WLAN processing module 510 may include a portion of a Rx chain of the WLAN module 265-*b*. In some examples, the portion of the Rx chain may be modified to support processing of the WWAN communication (e.g., to support GSM frequencies). After processing with the portion of the Rx chain in the WLAN processing module 510, the received WWAN communication may be routed to the wireless communications controller 315-*b* for further baseband processing. The WLAN module 265-*b* may route the WWAN communication to the wireless communications controller 315-*b* using a second switch 520. The wireless communications controller 315-*b* may then process the received WWAN communication using information from the second SIM 420-*a*.

For a transmitted WWAN communication, the wireless communications controller 315-*b* may configure the WWAN communication using information from the second SIM 420-*a*. The WWAN communication may then be routed to the WLAN module 265-*b* via the second switch 520. The WWAN communication may be routed to the WLAN module 265-*b* to bypass a portion of Tx chain of the WWAN module 260-*b*. The WLAN module 265-*b* may process the WWAN communication using the WLAN processing module 510. The WLAN processing module may include a portion of the Tx chain of the WLAN modem. In some examples, the portion of the Tx chain may be modified to support processing of the WWAN communication (e.g., to support GSM frequencies). After processing with the portion of the Tx chain in the WLAN processing module 510, the WWAN communication may be routed to the WWAN module 260-*b* via the first switch 515 for further processing and transmission.

The WWAN module 260-*b* may perform further processing of the WWAN communication using the WWAN processing module 505. The WWAN processing module 505 may include a portion of the Tx chain of the WWAN module 260-*b*. After processing by the portion of the Tx chain in the WWAN processing module 505, the WWAN module 260-*b* may transmit the WWAN communication over a diversity WWAN antennas 205-*b*.

Figure 6:
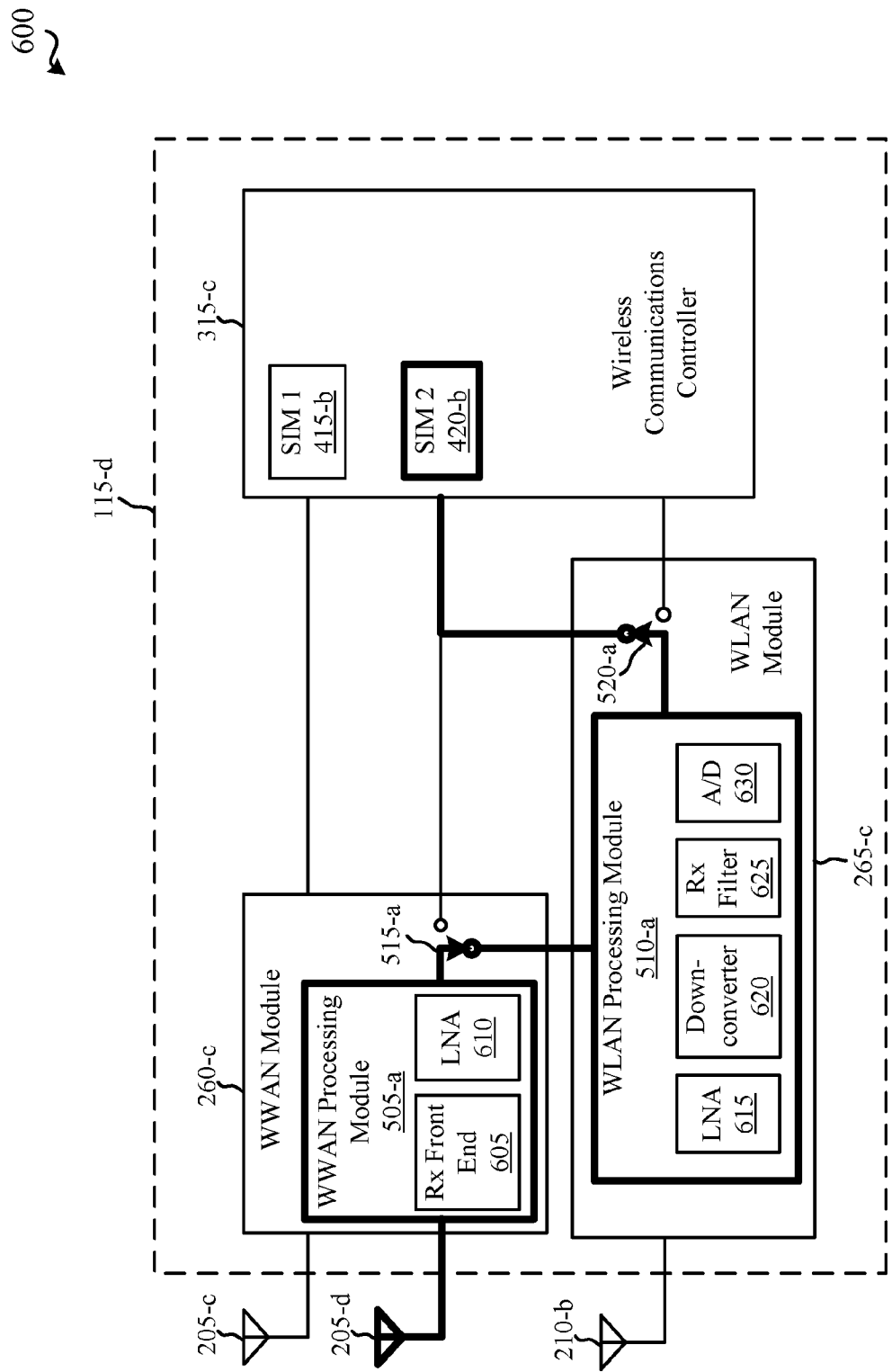
FIG. 6 shows another system for use in wireless communication, in accordance with various aspects of the present disclosure.

FIG. 6 shows a system 600 for use in wireless communication, in accordance with various examples. System 600 may include a UE 115-*d*, which may be an example of the UEs 115 of FIGS. 1, 2, and/or 5. UE 115-*d* may also be an example of one or more aspects of devices 305 of FIGS. 3 and/or 4.

The UE 115-*d* may include a WWAN module 260-*c*, a WLAN module 265-*c*, and a wireless communications controller 315-*c*. The wireless communications controller 315-*c* may support WWAN communications over multiple communications networks and/or multiple RATs through the use of multiple SIMs, such as first SIM 415-*b* and second SIM 420-*b*. In some examples, a first WWAN communication may support the first SIM 415-*b*. For example, the first WWAN communication may be an LTE communication. The first WWAN communication may be a WWAN transmission, and may be processed by the WWAN module 260-*c* and transmitted over a primary WWAN antennas 205-*c*. Alternatively or in addition, the first WWAN communication may be a received WWAN communication. The received WWAN communication may be received by the primary WWAN antennas 205-*c* and processed by the WWAN module 260-*c*. The first WWAN communication may then be further processed by the wireless communications controller 315-*c*, as facilitated by the first SIM 415-*b*.

In some examples, a second WWAN communication may support the second SIM 420-*b*. The second WWAN communication may occur at or near the same time as the first WWAN communication supported by the first SIM 415-*b*. The second WWAN communication may be a WWAN communication received over a different RAT and/or from a different communication network. For example, the second WWAN communication may be a GSM communication. The second WWAN communication may be received over a diversity WWAN antennas 205-*d*.

The wireless communications controller 315-*c* may configure a WWAN processing module 505-*a* of the WWAN module 260-*c* to process the received WWAN communication. The WWAN processing module 505-*a* may include a portion of a Rx chain of the WWAN module 260-*c*. For example, the WWAN processing module 505-*a* may include a RF front end 605 of the WWAN module Rx chain. The WWAN processing module 505-*a* may also include a low noise amplifier (LNA) 610 of the WWAN module Rx chain. The WWAN processing module 505-*a* may use the RF front end 605 for processing the received WWAN communication, or both the RF front end 605 and the LNA 610 for processing the received WWAN communication.

After processing with the WWAN processing module 505-*a*, the received WWAN communication may be routed to a WLAN module 265-*c* for further processing. The WWAN communication may be routed to the WLAN module 265-*c* using a first switch 515-*a*. The first switch 515-*a* may be configured by the wireless communications controller 315-*c* and/or the WWAN module 260-*c*. The first switch 515-*a* may allow the received WWAN communication to bypass the remaining components of the Rx chain of the WWAN module 260-*c*, so that the WWAN module 260-*b* may be available for other WWAN communications. The WLAN module 265-*c* may include WLAN antenna(s) 210-*b* capable of concurrently transmitting and/or receiving multiple wireless communications.

The WLAN processing module 510-*a* may include a portion of a Rx chain of the WLAN module 265-*c* for processing the received WWAN communication. For example, the WLAN processing module 510-*a* may include a LNA 615, a down-converter 620, a Rx filter 625, and an analog-to-digital (A/D) converter 630. If the WWAN communication was processed by the LNA 610 in the WWAN processing module 505-*a*, then the WWAN communication may be further processed by the down-converter 620 and Rx filter 625 in the WLAN processing module 510-*a*. If the WWAN communication was not processed by the LNA 610 in the WWAN processing module 505-*a*, then the WWAN communication may be further processed by the LNA 615, down-converter 620, and Rx filter 625 in the WLAN processing module 510-*a*. In some examples, the WWAN communication may be further processed by the A/D converter 630. In other examples, the WLAN module 265-*c* may output the WWAN communication in analog form for later digital conversion by the wireless communications controller 315-*c*.

After processing with the WLAN processing module 510-*a*, the received WWAN communication may be routed to the wireless communications controller 315-*c* for further baseband processing. The WLAN module 265-c may route the WWAN communication to the wireless communications controller 315-c using a second switch 520-a. The wireless communications controller 315-c may then process the received WWAN communication using information from the second SIM 420-b.

Figure 7:
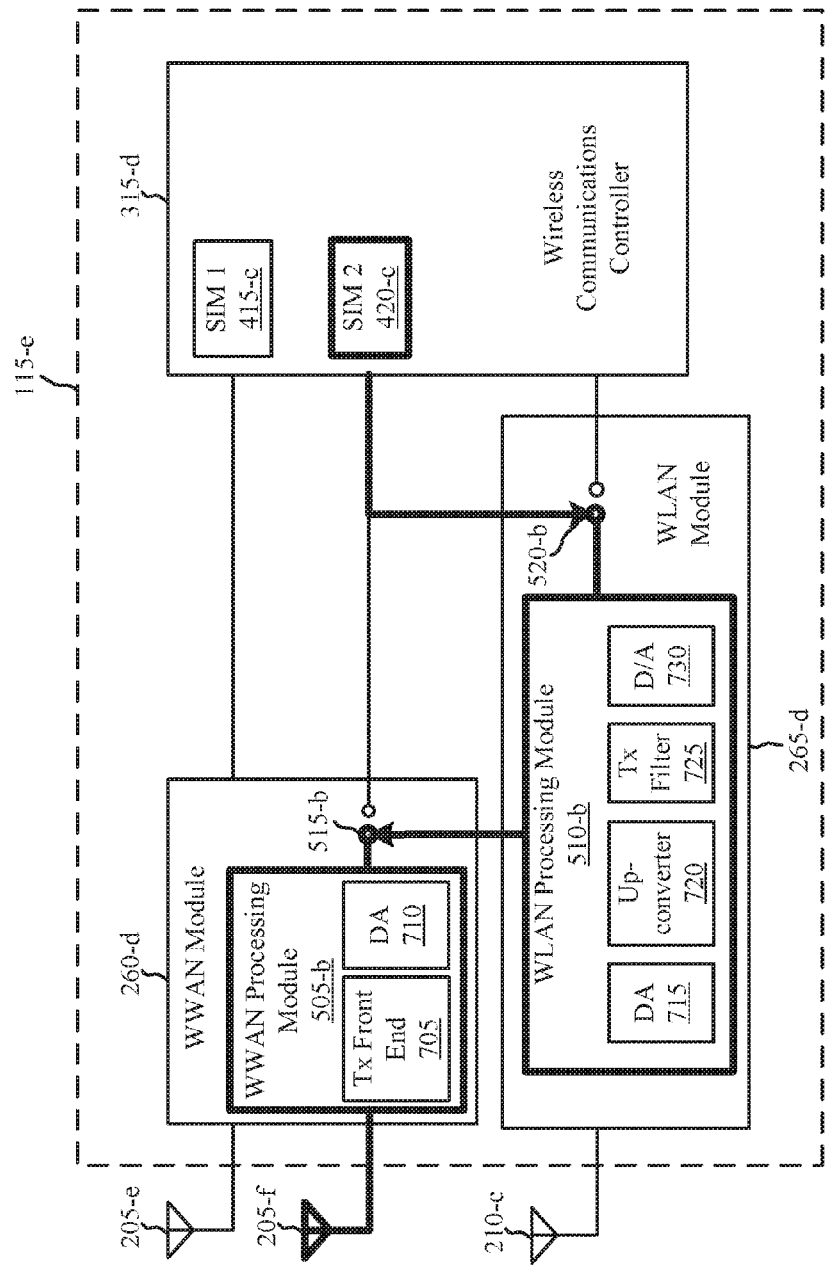
FIG. 7 shows yet another system for use in wireless communication, in accordance with various aspects of the present disclosure.

FIG. 7 shows a system 700 for use in wireless communication, in accordance with various examples. System 700 may include a UE 115-e, which may be an example of the UEs 115 of FIGS. 1, 2, and/or 5. UE 115-e may also be an example of one or more aspects of devices 305 of FIGS. 3 and/or 4.

The UE 115-e may include a WWAN module 260-d, a WLAN module 265-d, and a wireless communications controller 315-d. The wireless communications controller 315-d may support WWAN communications over multiple communications networks and/or multiple RATs through the use of multiple SIMs, such as first SIM 415-c and second SIM 420-c. In some examples, a first WWAN communication may support the first SIM 415-c. For example, the first WWAN communication may be an LTE communication. The first WWAN communication may be a WWAN transmission, and may be processed by the WWAN module 260-d and transmitted over a primary WWAN antennas 205-e. Alternatively or in addition, the first WWAN communication may be a received WWAN communication. The received WWAN communication may be received by the primary WWAN antennas 205-e and processed by the WWAN module 260-d. The first WWAN communication may then be further processed by the wireless communications controller 315-d, as facilitated by the first SIM 415-c.

In some examples, a second WWAN communication may support the second SIM 420-c. The second WWAN communication may occur at or near the same time as the first WWAN communication supported by the first SIM 415-c. The second WWAN communication may be a WWAN communication to be transmitted over a different RAT and/or on a different communication network. For example, the second WWAN communication may be a GSM communication. The second WWAN communication may be transmitted over a diversity WWAN antennas 205-f.

The wireless communications controller 315-d may configure the WWAN communication using information from the second SIM 420-c. The WWAN communication may then be routed to the WLAN module 265-d via a second switch 520-b. The WWAN communication may be routed to the WLAN module 265-d to bypass a portion of Tx chain of the WWAN module 260-d. The WLAN module 265-d may process the WWAN communication using the WLAN processing module 510-b. The WLAN module 265-d may include WLAN antenna(s) 210-c capable of concurrently transmitting and/or receiving multiple wireless communications.

The WLAN processing module 510-b may include a portion of the Tx chain of the WLAN module 265-d for processing the received WWAN communication. For example, the WLAN processing module 510-b may include a driver amplifier (DA) 715, an up-converter 720, a Tx filter 725, and digital-to-analog (D/A) converter 730. In some examples, the WWAN communication may have been converted to analog by the wireless communications controller 315-d, and then may be processed by the Tx filter 725 and up-converter 720. In other examples, the WWAN communication from the wireless communications controller 315-d may be digital, and then may also be processed by the D/A converter 730 of the WLAN module 265-d. In some examples, the WWAN communication may be amplified by the driver amplifier 715 of the WLAN module 265-d. After processing by one or more of the components of the WLAN processing module 510-b, the WWAN communication may be routed to the WWAN module 260-d via a first switch 515-b, and may bypass a portion of the WWAN Tx chain of the WWAN module 260-d, so that the portion of the WWAN module 260-d may be available for other WWAN communications.

The WWAN communication may be processed by the WWAN processing module 505-b of the WWAN module 260-d. The WWAN processing module 505-b may include a portion of the Tx chain of the WWAN module 260-d. For example, the WWAN processing module 505-b may include a RF front end 705 of the Tx chain and a driver amplifier 710 of the Tx chain. If the WWAN communication was not amplified by the driver amplifier 715 of the WLAN module 265-d, then the WWAN communication may be amplified by the driver amplifier 710 of the WWAN module 260-d. If the WWAN communication was amplified by the driver amplifier 715 of the WLAN module 265-d, then the WWAN processing module 505-b may bypass the driver amplifier 710 and process the WWAN communication using the RF front end 705 prior to transmission over the diversity WWAN antennas 205-f.

Figure 8:
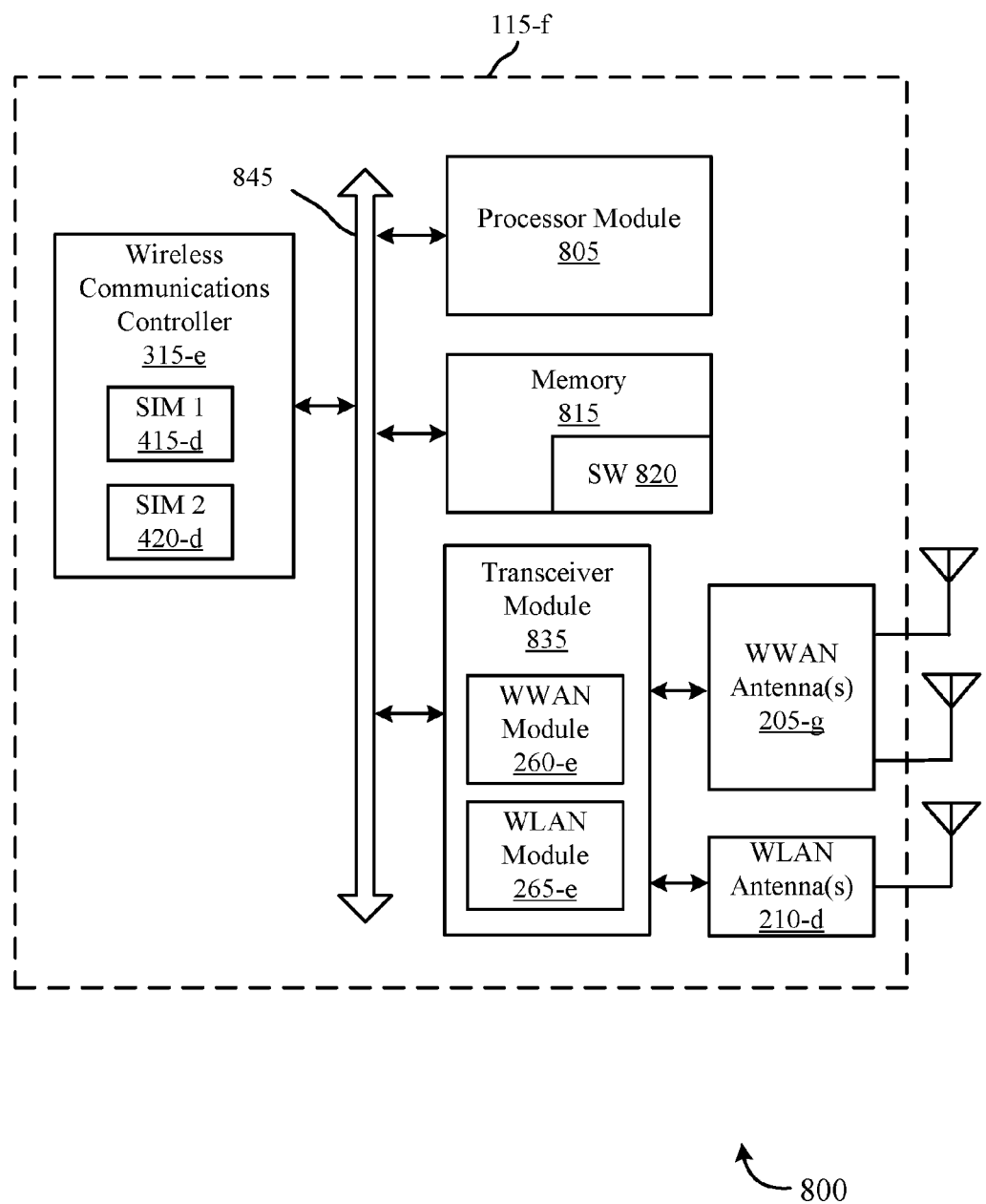
FIG. 8 shows still another system for use in wireless communication, in accordance with various aspects of the present disclosure.

FIG. 8 shows a system 800 for use in wireless communication, in accordance with various examples. System 800 may include a UE 115-f, which may be an example of the UEs 115 of FIGS. 1, 2, 5, 6, and/or 7. UE 115-f may also be an example of one or more aspects of devices 305 of FIGS. 3 and/or 4.

The UE 115-f may generally include components for bi-directional voice and data communications including components for transmitting communications and components for receiving communications. The UE 115-f may include WWAN antenna(s) 205-g, WLAN antenna(s) 210-d, a transceiver module 835, a processor module 805, and memory 815 (including software (SW) 820), which each may communicate, directly or indirectly, with each other (e.g., via one or more buses 845). The transceiver module 835 may be configured to communicate bi-directionally, via the WWAN antenna(s) 205-g, the WLAN antenna(s) 210-d, and/or one or more wired or wireless links, with one or more networks, as described above. For example, the transceiver module 835 may be configured to communicate bi-directionally with base stations 105 and with the access points 110 with reference to FIGS. 1 and/or 2. The transceiver module 835 may include a WWAN module 260-e configured to modulate the packets and provide the modulated packets to the WWAN antenna(s) 205-g for transmission, and to demodulate packets received from the WWAN antenna(s) 205-g.

The UE 115-f may have multiple WWAN antenna(s) 205-g capable of concurrently transmitting and/or receiving multiple wireless communications. The transceiver module 835 may be capable of concurrently communicating with one or more base stations 105 via multiple component carriers and/or communications networks. Additionally, the transceiver module 835 may include a WLAN module 265-e configured to modulate the packets and provide the modulated packets to the WLAN antenna(s) 210-d for transmission, and to demodulate packets received from the WLAN antenna(s) 210-d. The UE 115-f may have multiple WLAN antenna(s) 210-d capable of concurrently transmitting and/or or receiving multiple wireless communications. The transceiver module 835 may be capable of communicating with one or more access points 110 via the WLAN antenna(s) 210-d. The transceiver module 835 may use a portion of the components in the WLAN module 265-e to process WWAN communications received over the WWAN antenna(s) 205-g. The transceiver module 835 may also use a portion of the components in the WLAN module 265-e to process WWAN communications prior to transmission over the WWAN antenna(s) 205-g.

The UE 115-f may include a wireless communications controller 315-e, which may perform the functions described above for the wireless communications controller 315 of device 305 of FIGS. 3 and 4 and/or of UE 115 of FIGS. 5, 6, and 7. The wireless communications controller 315-e may include a first SIM 415-d and a second SIM 420-d. WWAN communications over a first communications network may support the first SIM 415-d, and WWAN communications over a second communications network may support the second SIM 420-d.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein (e.g., route WWAN communications to a WLAN module for processing, etc.). Alternatively, the computer-readable, computer-executable software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

Figure 9:
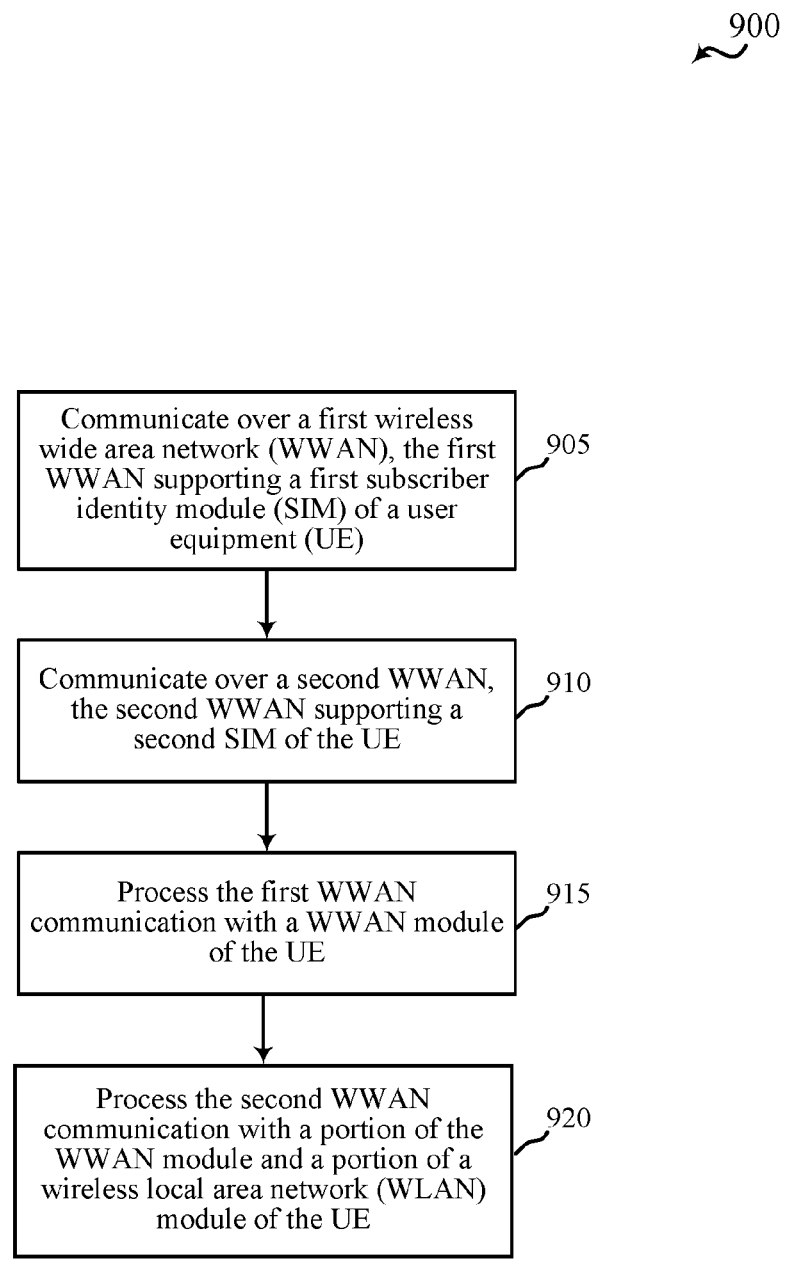
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the UEs 115 described with reference to FIGS. 1, 2, 5, 6, 7 and/or 8, and/or aspects of one or more of the devices 305 described with reference to FIGS. 3 and/or 4. In some examples, a UE may execute one or more sets of codes to control the functional elements of the UE to perform the functions described below. Additionally or alternatively, the UE may perform one or more of the functions described below using special-purpose hardware.

At block 905, the method 900 may include communicating over a first wireless wide area network (WWAN), the first WWAN supporting a first subscriber identity module (SIM) of a user equipment (UE). Communicating over the first WWAN may include receiving a WWAN signal on a primary WWAN antenna of the WWAN module. Communicating over the first WWAN may also include transmitting a WWAN signal on the primary WWAN antenna of the WWAN module. The operations at block 905 may be performed using the WWAN module 260 described with reference to FIGS. 4, 5, 6, 7, and 8.

At block 910, the method 900 may include communicating over a second WWAN, the second WWAN supporting a second SIM of the UE. Communicating over the second WWAN may include receiving a WWAN signal on a diversity WWAN antenna of the WWAN module. Communicating over the second WWAN may also include transmitting a WWAN signal on a diversity WWAN antenna of the WWAN module. In some examples, the second WWAN may be a global system for mobile communications (GSM) network. The operations at block 910 may be performed using the WWAN module 260 described with reference to FIGS. 4, 5, 6, 7, and 8.

At block 915, the method 900 may include processing the first WWAN communication with a WWAN module of the UE. The operations at block 915 may be performed using the WWAN module 260 and/or wireless communications controller 315 described with reference to FIGS. 4, 5, 6, 7, and 8.

At block 920, the method 900 may include processing the second WWAN communication with a portion of the WWAN module and a portion of a wireless local area network (WLAN) module of the UE. Processing the second WWAN communication may include processing a received WWAN signal using radio frequency (RF) frontend components of the WWAN module. The received WWAN signal may then be routed to the WLAN module and processed using a low noise amplifier, down-converter and filter of the WLAN module. In some examples, the received WWAN signal may be further processed using an analog-to-digital converter of the WLAN module. In some examples, processing the second WWAN communication may include processing a received WWAN signal using radio frequency (RF) frontend components and a low noise amplifier of the WWAN module. The received WWAN signal may then be routed to the WLAN module and processed using the down-converter and filter of the WLAN module.

In some examples, processing the second WWAN communication may include routing a WWAN signal to WLAN module prior to transmission and processing the WWAN signal using a driver amplifier and filter of a WLAN module. The WWAN signal may then be routed a WWAN module and processed using frontend radio frequency (RF) components of the WWAN module. In some examples, the WWAN signal may be processed using a digital-to-analog converter of the WLAN module before being processed by the driver amplifier and filter of the WLAN module. The operations at block 920 may be performed using the WWAN module 260, WLAN module 265, and/or wireless communications controller 315 described with reference to FIGS. 4, 5, 6, 7, and 8.

Thus, the method 900 may provide for wireless communication. It should be noted that the method 900 is just one implementation and that the operations of the method 900 may be rearranged or otherwise modified such that other implementations are possible.

Figure 10:
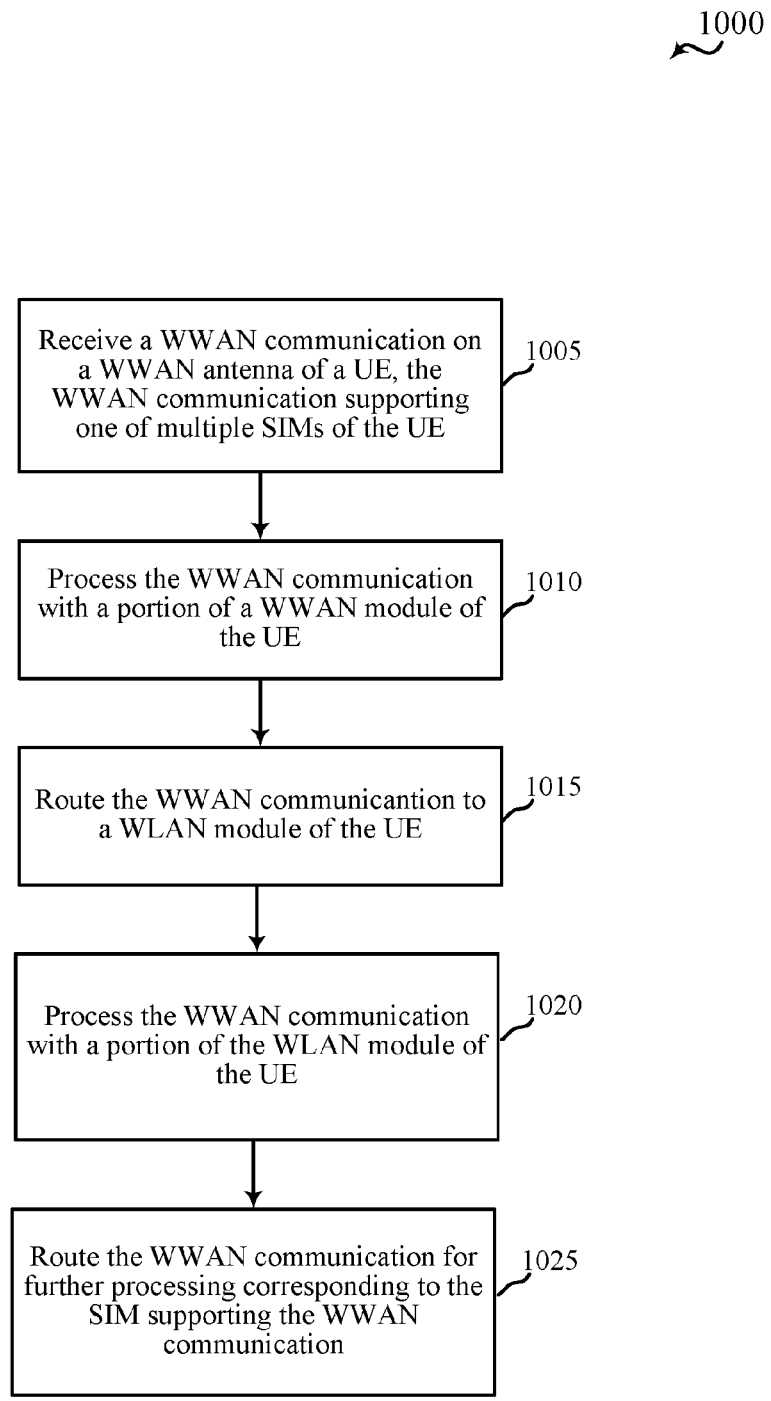
FIG. 10 is a flow chart illustrating another example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the UEs 115 described with reference to FIGS. 1, 2, 5, 6, 7 and/or 8, and/or aspects of one or more of the devices 305 described with reference to FIGS. 3 and/or 4. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include receiving a WWAN communication on a WWAN antenna of a UE, the WWAN communication supporting one of multiple SIMs of the UE. In some examples, the WWAN communication may be a global system for mobile communications (GSM) communication. The operations at block 1005 may be performed using the WWAN module 260 described with reference to FIGS. 4, 5, 6, 7, and 8.

At block 1010, the method 1000 may include processing the WWAN communication with a portion of a WWAN module of the UE. The WWAN communication may be processed using radio frequency (RF) frontend components of the WWAN module. In some examples, the WWAN communication may also be processed using a low noise amplifier of the WWAN module. Other components of the WWAN module, such as synthesizers, filters, and/or analog to digital converters, may be bypassed. The operations at block 1010 may be performed using the WWAN module 260 described with reference to FIGS. 4, 5, 6, 7, and 8.

At block 1015, the method 1000 may include routing the WWAN communication to a WLAN module of the UE. Routing the WWAN communication to the WLAN module may bypass other components of the WWAN module, such as synthesizers, filters, and/or analog to digital converters. The operations at block 1015 may be performed using the WWAN module 260 and/or wireless communications controller 315 described with reference to FIGS. 4, 5, 6, 7, and 8.

At block 1020, the method 1000 may include processing the WWAN communication with a portion of the WLAN module of the UE. The WWAN communication may be processed using a low noise amplifier, down-converter and filter of the WLAN module. In some examples, the WWAN communication may be further processed using an analog-to-digital converter of the WLAN module. The operations at block 1020 may be performed using the WLAN module 265 described with reference to FIGS. 4, 5, 6, 7, and 8.

At block 1025, the method 1000 may include routing the WWAN communication for further processing corresponding to the SIM supporting the WWAN communication. The WWAN communication may be routed to a wireless communications controller, which may read information from the SIM for further processing of the WWAN communication. The operations at block 1025 may be performed using the WLAN module 265 and wireless communications controller 315 described with reference to FIGS. 4, 5, 6, 7, and 8.

Thus, the method 1000 may provide for wireless communication. It should be noted that the method 1000 is just one implementation and that the operations of the method 1000 may be rearranged or otherwise modified such that other implementations are possible.

Figure 11:
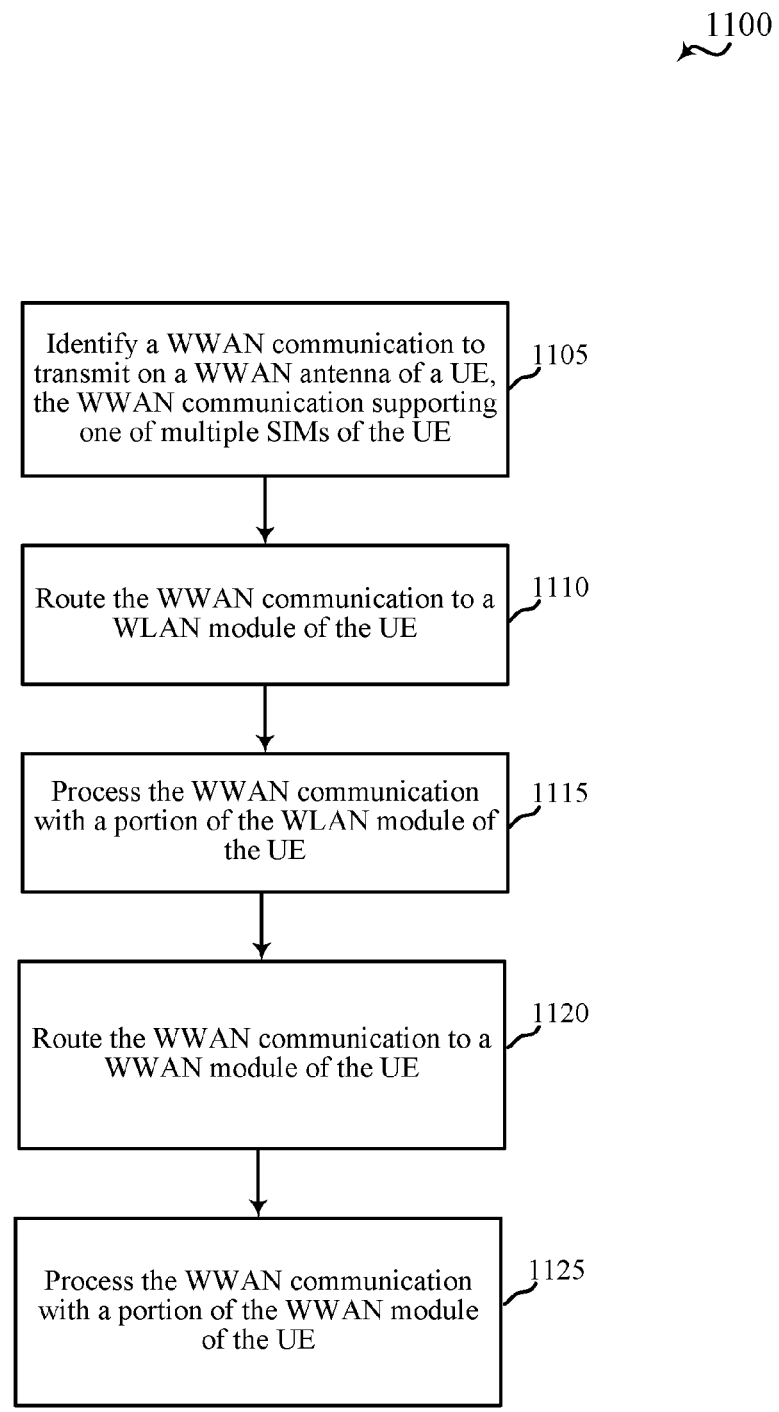
FIG. 11 is a flow chart illustrating yet another example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the UEs 115 described with reference to FIGS. 1, 2, 5, 6, 7 and/or 8, and/or aspects of one or more of the devices 305 described with reference to FIGS. 3 and/or 4. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include identifying a WWAN communication to transmit on a WWAN antenna of a UE. The WWAN communication may support one of multiple SIMs of the UE, and may be configured by reading the information from one of the multiple SIMs of the UE. In some examples, the WWAN communication may be a global system for mobile communications (GSM) communication. The operations at block 1105 may be performed using the wireless communications controller 315 described with reference to FIGS. 4, 5, 6, 7, and 8.

At block 1110, the method 1100 may include routing the WWAN communication to a WLAN module of the UE. Routing the WWAN communication to the WLAN module may bypass components of a WWAN module of the UE. The operations at block 1110 may be performed using the WWAN module 260 and/or wireless communications controller 315 described with reference to FIGS. 4, 5, 6, 7, and 8.

At block 1115, the method 1100 may include processing the WWAN communication with a portion of the WLAN module of the UE. The WWAN communication may be processed using a low noise amplifier, down-converter and filter of the WLAN module. In some examples, the WWAN communication may be further processed using an analog-to-digital converter of the WLAN module. The operations at block 1115 may be performed using the WLAN module 265 described with reference to FIGS. 4, 5, 6, 7, and 8.

At block 1120, the method 1100 may include routing the WWAN communication to a WWAN module of the UE. The WWAN communication may routed to bypass a portion of the components of the WLAN module and the WWAN module. The operations at block 1120 may be performed using the WLAN module 265 and/or the wireless communications controller 315 described with reference to FIGS. 4, 5, 6, 7, and 8.

At block 1125, the method 1100 may include processing the WWAN communication with a portion of the WWAN module of the UE. The WWAN communication may be processed using radio frequency (RF) frontend components of the WWAN module. In some examples, the WWAN communication may also be processed using a low noise amplifier of the WWAN module. Other components of the WWAN module, such as synthesizers, filters, and/or analog to digital converters, may be bypassed. The operations at block 1125 may be performed using the WWAN module 260 described with reference to FIGS. 4, 5, 6, 7, and 8.

Thus, the method 1100 may provide for wireless communication. It should be noted that the method 1100 is just one implementation and that the operations of the method 1000 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, via a first antenna associated with a first radio access technology, a first signal corresponding to the first radio access technology;
   receiving, via a second antenna associated with the first radio access technology, a second signal corresponding to the first radio access technology; and
   processing the second signal by at least one component associated with a second radio access technology, the second radio access technology being different from the first radio access technology.

2. The method of claim 1, further comprising:
   processing the first signal by at least one component associated with the first radio access technology.

3. The method of claim 1, wherein the first radio access technology supports a first subscriber identity module (SIM) of the UE, and the second radio access technology supports a second SIM of the UE.

4. The method of claim 1, wherein the first radio access technology is associated with a wireless wide area network (WWAN).

5. The method of claim 1, wherein the second radio access technology is associated with a wireless local area network (WLAN).

6. The method of claim 1, further comprising:
   processing the second signal using a radio frequency (RF) front end component associated with the first radio access technology.

7. The method of claim 1, further comprising:
processing the second signal using an amplifier associated with the first radio access technology.

8. The method of claim 1, wherein the at least one component associated with the second radio access technology comprises a filter.

9. The method of claim 1, wherein the at least one component associated with the second radio access technology comprises a down-converter.

10. The method of claim 1, wherein the at least one component associated with the second radio access technology comprises an amplifier.

11. The method of claim 1, wherein the at least one component associated with the second radio access technology comprises an analog-to-digital converter.

12. The method of claim 1, wherein the second antenna is a diversity antenna associated with the first radio access technology.

13. The method of claim 1, further comprising:
receiving, via a third antenna associated with the second radio access technology, a third signal corresponding to the second radio access technology.

14. The method of claim 1, wherein the first signal is associated with one of Long Term Evolution (LTE) communications or LTE-Advanced (LTE-A) communications.

15. The method of claim 1, wherein the second signal is associated with global system for mobile communications (GSM).

16. The method of claim 6, further comprising:
routing the second signal from the RF front end component associated with the first radio access technology to the at least one component associated with the second radio access technology.

17. The method of claim 13, further comprising:
determining a first time for processing the second signal by the at least one component associated with the second radio access technology; and
determining a second time for processing the third signal by the at least one component associated with the second radio access technology.

18. The method of claim 13, wherein the third signal is associated with Wireless Fidelity (Wi-Fi) communications.

19. The method of claim 16, further comprising:
routing the second signal from the at least one component associated with the second radio access technology to a baseband component associated with the first radio access technology, wherein the at least one component associated with the second radio access technology is an analog component.

20. A method for wireless communication, comprising:
transmitting, via a first antenna associated with a first radio access technology, a first signal corresponding to the first radio access technology;
processing a second signal by at least one component associated with a second radio access technology, the second radio access technology being different from the first radio access technology; and
transmitting, via a second antenna associated with the first radio access technology, the second signal corresponding to the first radio access technology.

21. The method of claim 20, further comprising:
processing the first signal by at least one component associated with the first radio access technology.

22. The method of claim 20, wherein the first radio access technology supports a first subscriber identity module (SIM) of the UE, and the second radio access technology supports a second SIM of the UE.

23. The method of claim 20, wherein the first radio access technology is associated with a wireless wide area network (WWAN).

24. The method of claim 20, wherein the second radio access technology is associated with a wireless local area network (WLAN).

25. The method of claim 20, further comprising:
routing the second signal from a baseband component associated with the first radio access technology to the at least one component associated with the second radio access technology, wherein the at least one component associated with the second radio access technology is an analog component.

26. The method of claim 20, wherein the at least one component associated with the second radio access technology comprises a synthesizer.

27. The method of claim 20, wherein the at least one component associated with the second radio access technology comprises a filter.

28. The method of claim 20, wherein the at least one component associated with the second radio access technology comprises a digital-to-analog converter.

29. The method of claim 20, wherein the second antenna is a diversity antenna associated with the first radio access technology.

30. The method of claim 20, further comprising:
determining a first time for processing the second signal by the at least one component associated with the second radio access technology; and
determining a second time for processing a third signal by the at least one component associated with the second radio access technology, the third signal corresponding to the second radio access technology.

31. The method of claim 20, wherein the first signal is associated with one of Long Term Evolution (LTE) communications or LTE-Advanced (LTE-A) communications.

32. The method of claim 20, wherein the second signal is associated with global system for mobile communications (GSM).

33. The method of claim 25, further comprising:
routing the second signal from the at least one component associated with the second radio access technology to a radio frequency (RF) front end component associated with the first radio access technology.

34. The method of claim 30, further comprising:
transmitting, via a third antenna associated with the second radio access technology, the third signal during the second time for processing the third signal.

35. The method of claim 30, wherein the third signal is associated with Wireless Fidelity (Wi-Fi) communications.

36. The method of claim 33, further comprising:
processing the second signal using an RF front end component associated with the first radio access technology.

37. An apparatus for wireless communication, comprising:
a processor;
memory in electronic communication with the processor; and
instructions stored in the memory, the instructions being executable by the processor to:
receive, via a first antenna associated with a first radio access technology, a first signal corresponding to the first radio access technology;
receive, via a second antenna associated with the first radio access technology, a second signal corresponding to the first radio access technology; and process the second signal by at least one component associated with a second radio access technology, the second radio access technology being different from the first radio access technology.

38. The apparatus of claim 37, wherein the instructions are further executable by the processor to:
process the first signal by at least one component associated with the first radio access technology.

39. The apparatus of claim 37, wherein the first radio access technology supports a first subscriber identity module (SIM) of the UE, and the second radio access technology supports a second SIM of the UE.

40. The apparatus of claim 37, wherein the first radio access technology is associated with a wireless wide area network (WWAN).

41. The apparatus of claim 37, wherein the second radio access technology is associated with a wireless local area network (WLAN).

42. The apparatus of claim 37, wherein the instructions are further executable by the processor to:
process the second signal using a radio frequency (RF) front end component associated with the first radio access technology.

43. The apparatus of claim 37, wherein the instructions are further executable by the processor to:
process the second signal using an amplifier associated with the first radio access technology.

44. The apparatus of claim 37, wherein the at least one component associated with the second radio access technology comprises a filter.

45. The apparatus of claim 37, wherein the at least one component associated with the second radio access technology comprises a down-converter.

46. The apparatus of claim 37, wherein the at least one component associated with the second radio access technology comprises an amplifier.

47. The apparatus of claim 37, wherein the at least one component associated with the second radio access technology comprises an analog-to-digital converter.

48. The apparatus of claim 37, wherein the second antenna is a diversity antenna associated with the first radio access technology.

49. The apparatus of claim 37, wherein the instructions are further executable by the processor to:
receive, via a third antenna associated with the second radio access technology, a third signal corresponding to the second radio access technology.

50. The apparatus of claim 37, wherein the first signal is associated with one of Long Term Evolution (LTE) communications or LTE-Advanced (LTE-A) communications.

51. The apparatus of claim 37, wherein the second signal is associated with global system for mobile communications (GSM).

52. The apparatus of claim 42, wherein the instructions are further executable by the processor to:
route the second signal from the RF front end component associated with the first radio access technology to the at least one component associated with the second radio access technology.

53. The apparatus of claim 49, wherein the instructions are further executable by the processor to:
determine a first time for processing the second signal by the at least one component associated with the second radio access technology; and
determine a second time for processing the third signal by the at least one component associated with the second radio access technology.

54. The apparatus of claim 49, wherein the third signal is associated with Wireless Fidelity (Wi-Fi) communications.

55. The apparatus of claim 52, wherein the instructions are further executable by the processor to:
route the second signal from the at least one component associated with the second radio access technology to a baseband component associated with the first radio access technology, wherein the at least one component associated with the second radio access technology is an analog component.

56. An apparatus for wireless communication, comprising:
a processor;
memory in electronic communication with the processor; and
instructions stored in the memory, the instructions being executable by the processor to:
transmit, via a first antenna associated with a first radio access technology, a first signal corresponding to the first radio access technology;
process a second signal by at least one component associated with a second radio access technology, the second radio access technology being different from the first radio access technology; and
transmit, via a second antenna associated with the first radio access technology, the second signal corresponding to the first radio access technology.

57. The apparatus of claim 56, wherein the instructions are further executable by the processor to:
process the first signal by at least one component associated with the first radio access technology.

58. The apparatus of claim 56, wherein the first radio access technology supports a first subscriber identity module (SIM) of the UE, and the second radio access technology supports a second SIM of the UE.

59. The apparatus of claim 56, wherein the first radio access technology is associated with a wireless wide area network (WWAN).

60. The apparatus of claim 56, wherein the second radio access technology is associated with a wireless local area network (WLAN).

61. The apparatus of claim 56, wherein the instructions are further executable by the processor to:
route the second signal from a baseband component associated with the first radio access technology to the at least one component associated with the second radio access technology, wherein the at least one component associated with the second radio access technology is an analog component.

62. The apparatus of claim 56, wherein the at least one component associated with the second radio access technology comprises a synthesizer.

63. The apparatus of claim 56, wherein the at least one component associated with the second radio access technology comprises a filter.

64. The apparatus of claim 56, wherein the at least one component associated with the second radio access technology comprises a digital-to-analog converter.

65. The apparatus of claim 56, wherein the second antenna is a diversity antenna associated with the first radio access technology.

66. The apparatus of claim 56, wherein the instructions are further executable by the processor to:
determining a first time for processing the second signal by the at least one component associated with the second radio access technology; and determining a second time for processing a third signal by the at least one component associated with the second radio access technology, the third signal corresponding to the second radio access technology.

67. The apparatus of claim 56, wherein the first signal is associated with one of Long Term Evolution (LTE) communications or LTE-Advanced (LTE-A) communications.

68. The apparatus of claim 61, wherein the instructions are further executable by the processor to:
route the second signal from the at least one component associated with the second radio access technology to a radio frequency (RF) front end component associated with the first radio access technology.

69. The apparatus of claim 66, wherein the instructions are further executable by the processor to:
transmitting, via a third antenna associated with the second radio access technology, the third signal during the second time for processing the third signal.

70. The apparatus of claim 66, wherein the third signal is associated with Wireless Fidelity (Wi-Fi) communications.

71. The apparatus of claim 68, wherein the instructions are further executable by the processor to:
process the second signal using an RF front end component associated with the first radio access technology.

72. An apparatus for wireless communication, comprising:
means for receiving, via a first antenna associated with a first radio access technology, a first signal corresponding to the first radio access technology;
means for receiving, via a second antenna associated with the first radio access technology, a second signal corresponding to the first radio access technology; and
means for processing the second signal by at least one component associated with a second radio access technology, the second radio access technology being different from the first radio access technology.

73. The apparatus of claim 72, further comprising:
means for processing the first signal by at least one component associated with the first radio access technology.

74. The apparatus of claim 72, wherein the first radio access technology supports a first subscriber identity module (SIM) of the UE, and the second radio access technology supports a second SIM of the UE.

75. The apparatus of claim 72, wherein the first radio access technology is associated with a wireless wide area network (WWAN).

76. The apparatus of claim 72, further comprising:
means for processing the second signal using a radio frequency (RF) front end component associated with the first radio access technology.

77. An apparatus for wireless communication, comprising:
means for transmitting, via a first antenna associated with a first radio access technology, a first signal corresponding to the first radio access technology;
means for processing a second signal by at least one component associated with a second radio access technology, the second radio access technology being different from the first radio access technology; and
means for transmitting, via a second antenna associated with the first radio access technology, the second signal corresponding to the first radio access technology.

78. The apparatus of claim 77, further comprising:
means for processing the first signal by at least one component associated with the first radio access technology.

79. The apparatus of claim 77, wherein the first radio access technology supports a first subscriber identity module (SIM) of the UE, and the second radio access technology supports a second SIM of the UE.

80. The apparatus of claim 77, wherein the first radio access technology is associated with a wireless wide area network (WWAN).

81. The apparatus of claim 77, further comprising:
means for routing the second signal from a baseband component associated with the first radio access technology to the at least one component associated with the second radio access technology, wherein the at least one component associated with the second radio access technology is an analog component.

82. A non-transitory computer-readable medium storing computer-executable code for wireless communication, the code executable by a processor to cause a device to:
receive, via a first antenna associated with a first radio access technology, a first signal corresponding to the first radio access technology;
receive, via a second antenna associated with the first radio access technology, a second signal corresponding to the first radio access technology; and
process the second signal by at least one component associated with a second radio access technology, the second radio access technology being different from the first radio access technology.

83. The non-transitory computer-readable medium of claim 82, wherein the code is further executable by the processor to cause the device to:
process the first signal by at least one component associated with the first radio access technology.

84. The non-transitory computer-readable medium of claim 82, wherein the first radio access technology supports a first subscriber identity module (SIM) of the UE, and the second radio access technology supports a second SIM of the UE.

85. The non-transitory computer-readable medium of claim 82, wherein the first radio access technology is associated with a wireless wide area network (WWAN).

86. The non-transitory computer-readable medium of claim 82, wherein the code is further executable by the processor to cause the device to:
process the second signal using a radio frequency (RF) front end component associated with the first radio access technology.

87. A non-transitory computer-readable medium storing computer-executable code for wireless communication, the code executable by a processor to cause a device to:
transmit, via a first antenna associated with a first radio access technology, a first signal corresponding to the first radio access technology;
process a second signal by at least one component associated with a second radio access technology, the second radio access technology being different from the first radio access technology; and
transmit, via a second antenna associated with the first radio access technology, the second signal corresponding to the first radio access technology.

88. The non-transitory computer-readable medium of claim 87, wherein the code is further executable by the processor to cause the device to:
process the first signal by at least one component associated with the first radio access technology.

89. The non-transitory computer-readable medium of claim 87, wherein the first radio access technology supports a first subscriber identity module (SIM) of the UE, and the second radio access technology supports a second SIM of the UE.

90. The non-transitory computer-readable medium of claim 87, wherein the first radio access technology is associated with a wireless wide area network (WWAN).

91. The non-transitory computer-readable medium of claim 87, wherein the code is further executable by the processor to cause the device to:
  route the second signal from a baseband component associated with the first radio access technology to the at least one component associated with the second radio access technology, wherein the at least one component associated with the second radio access technology is an analog component.

* * * * *